United States Patent [19]

Lee, Jr. et al.

[11] 4,228,062

[45] Oct. 14, 1980

[54] RAPID SETTING HIGH BOND STRENGTH ADHESIVE

[75] Inventors: Henry L. Lee, Jr., Pasadena; Jan A. Orlowski, Altadena, both of Calif.

[73] Assignee: Lee Pharmaceuticals, South El Monte, Calif.

[21] Appl. No.: 902,091

[22] Filed: May 2, 1978

Related U.S. Application Data

[63] Continuation of Ser. No. 714,841, Aug. 16, 1976, abandoned, which is a continuation of Ser. No. 386,416, Aug. 7, 1973, abandoned.

[51] Int. Cl.$^2$ ............................................. C08K 3/36
[52] U.S. Cl. ............................... 260/42.28; 156/330; 156/332; 260/42.52; 260/998.11; 525/286; 525/426; 525/440; 525/445; 525/455; 525/913; 526/273
[58] Field of Search ............... 260/42.28, 998.11, 836, 260/42.52; 526/273; 525/286

[56] References Cited

U.S. PATENT DOCUMENTS

| | | | |
|---|---|---|---|
| 3,453,246 | 7/1969 | Heilman | 260/836 |
| 3,699,186 | 10/1972 | Schrage | 260/836 |

*Primary Examiner*—James H. Derrington
*Attorney, Agent, or Firm*—Irons and Sears

[57] ABSTRACT

Disclosed is a rapid setting adhesive of low toxicity having high bond strength to a variety of metals and plastics, and particularly to stainless steel, polycarbonate plastics and tooth enamel. The composition consists essentially of (A) a resin which is formed from an ester of methacrylic acid with a monoalcohol containing at least one epoxy group and (B) a filler which may be any of a plurality of finely divided materials that are insoluble in ambient fluids or a mixture of such fillers, parts (A) and (B) being present in a weight ratio such that the initial mixture at ambient temperature and pressure is a viscous liquid or paste. Also included are minor amounts of a conventional polymerization catalyst and a conventional polymerization accelerator. Preferably parts (A) and (B) are packaged separately, with polymerization catalyst included in only one package. In one embodiment of the invention, to insure thermostability at elevated temperatures, about 10 to about 80 parts by weight, per 100 parts of (A) plus (B), of an aliphatic or aromatic dimethacrylate is added as a crosslinking agent. In a preferred embodiment (A) is glycidyl methacrylate. Many variations are possible within the scope of the invention depending upon the viscosity, set time and mechanical bond strength desired for a particular end use.

8 Claims, No Drawings

RAPID SETTING HIGH BOND STRENGTH ADHESIVE

CROSS-REFERENCES TO RELATED APPLICATIONS

This application is a continuation of application Ser. No. 714,841, filed Aug. 16, 1976 now abandoned, which in turn is a continuation of application Ser. No. 386,416, filed Aug. 7, 1973 and now abandoned.

BACKGROUND OF THE INVENTION

1. Field of the Invention

This invention is concerned with rapid setting high bond strength adhesives for bonding metals and plastics together and for bonding either or both to tooth enamel. Applications exist in dentistry, cosmetics and in a plurality of industrial fields as more fully developed hereinafter.

2. Description of the Prior Art

Adhesives heretofore utilized for bonding stainless steel or plastic orthodontic braces or brackets to tooth enamel have generally been of three types—i.e., (1) a blend of aromatic diacrylates with aliphatic diacrylates cured with a conventional catalyst—tertiary amine accelerator system, (2) a blend of methylmethacrylate monomer with polymethylmethacrylate polymer using a peroxide or trialkyl borane curing catalyst, (3) an aromatic diacrylate system containing conventional ultraviolet sensitive accelerators, cured with an ultraviolet gun.

All of these adhesives show poor water resistance, poor peel resistance and poor retention to tooth enamel in orthodontic service. All of these adhesives show poor adhesion also to stainless steel—long used for orthodontic brackets—and to polycarbonate plastics, today the preferred bracket material of many orthodontists for aesthetic reasons. Frequently as many as 50% of the brackets bonded with these adhesives are lost within 30 days of application. In the case of polycarbonate brackets, moreover, sanding does not materially improve adhesion—probably because they contain mold releas additives, e.g., silicone oil. In the case of stainless steel brackets it is necessary to perforate the base with multiple holes to improve mechanical as well as adhesive retention with any of the common adhesives described above.

The adhesives referred to—and particularly those including methyl methacrylate monomer as one constituent—have found cosmetic use in products for mending cracks in finger and toenails, lengthening the nails and the like. In these uses as in dental uses, however, products containing significant amounts of methyl methacrylate monomer have the disadvantages of unpleasant odor and of high evaporability (due to the low boiling point of the monomer), the latter attended by poor reproducibility of the composition and by a tendency of the cured composition to crack due to evaporation of monomer even after initial cure. In addition, methyl methacrylate monomer has an irritant effect on many individuals, producing dermatitis and other allergic reactions. In some cases, individuals treated with methyl methacrylate monomer-containing compositions have exhibited more severe toxic reactions.

In another dental application, polycarbonate glass-filler reinforced dental crown forms intended to serve as relatively long term (five to ten year) expectancy crowns over a crown preparation on a tooth have heretofore been seated with conventional dental cements of the phosphate type or with polycarboxylate acid cements prepared from polymethacrylic acid and zinc oxide. These cements, however, do not bond strongly to polycarbonate. Moreover, they tend to deteriorate in oral fluids with the result that the crown form often is not retained for its full life expectancy.

There is also a need for adhesives of high strength which will set in about 90 seconds for a plurality of industrial applications involving bonding of metals to plastics, bonding of different plastics to one another, patching of glass, etc. Examples of this need are in various electronic devices where plastic must be joined to itself or to metal, in tubing, piping and electrical insulation where polycarbonate, Teflon, polyethylene, polypropylene and similar plastics must be bonded to one another or to metals, in the assembly of outdoor signs, etc. For example, adhesives now used for joining plastic piping for irrigation and like uses often require in the order of two hours setting time in the field. Few adhesives having both the requisite strength and set time are now known—and those that are available for industrial uses are often too toxic for dental or cosmetic uses.

SUMMARY OF THE INVENTION

According to the invention there are provided rapid setting high strength adhesive compositions of low toxicity suitable for bonding a variety of metals and plastics to a variety of substrates including tooth enamel and finger or toenails. These compositions are of special value in bonding orthodontic brackets made from stainless steel or polycarbonate or other plastic to tooth enamel and for bonding glass-fiber filled polycarbonate and other plastic crown forms to tooth crown preparations. They are suitable for artificial fingernails and for nail mending preparations. They are also suitable for numerous industrial applications where plastic-metal bonds are desirable or where polycarbonate or other plastics such as polyethylene, polypropylene, polytetrafluoroethylene (Teflon), acrylic resins, etc. must be bonded to one another. They are also suitable for bonding polycarbonate horse shoes to horse hooves.

They are especially desirable in glass and china mending compositions and the like. In such uses, the filler is selected especially for the reflectance properties to be imparted to the cured composition—e.g., finely divided MgO for high reflectance compositions, finely divided $TiO_2$ for opaque compositions, etc. Other exemplary specific applications are in bonding the joints of irrigation pipes, in bonding electrical insulation, in assembling outdoor signs, in assembling metal to plastic or glass in various electronic devices, in bonding cable terminals and connecting wires, and in any other uses where a setting time in the order of 90 seconds and a bond strength of at least 1000–2000 psi is desired.

In essence the adhesive compositions of the invention are prepared from (A) an ester of methacrylic acid with a monoalcohol containing at least one epoxy group and (B) a filler which may be a cured copolymer of methyl methacrylate and ethyl methacrylate, cured polymethylmethacrylate, polyethylmethacrylate, $TiO_2$, MgO, quartz, glass, silica, aluminum oxide, pelletized polyurethane or nylon, fibers of nylon, polyester or polyacrylic resin, or any other mineral or organic finely dispersed material. Mixtures of organic and inorganic fillers may be used. In all cases the fillers are finely divided. For dental uses, the filler must be nontoxic and insoluble in oral fluids. For both dental and cosmetic uses the filler should be nonallergenic as well as nontoxic. For cosmetic and out-door uses, stability to water is a desideratum in selecting the filler. In large part the filler is selected on the basis of the requirements of the end use to which the adhesive composition will be put. The weight ratio of (A) to (B) is so selected that the initial mixture is a viscous liquid or paste. Preferably the (A) component is present in an amount by weight of about 10%, and more preferably of about 20%, to about 80% of the combined weight of (A) and (B). Conveniently (A) and (B) are packaged separately with each containing a minor amount of a conventional inhibitor of the hydroquinone or hydroxytoluene type. One of the two is also provided with a conventional minor amount of a well-known peroxide polymerization catalyst, and either or both may contain a conventional minor amount of a polymerization accelerator of, e.g., the well-known tertiary amine type.

Glycidyl methacrylate is the preferred (A) component, though other glycidyl type methacrylates, e.g., glycidoxyl propyl methacrylate and the like may be used. Other possible (A) components may be prepared by reacting various epoxy monomers with methacrylic acid to achieve monomers having at least one epoxy group, of which the following is exemplary:

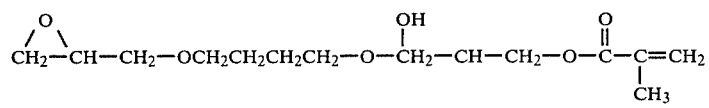

It is also within the contemplation of the invention that various copolymerizable epoxy monomers be blended with glycidyl methacrylate or another acrylate monomer, preferably of the glycidyl type, to form the (A) component. Copolymerizable mixtures of a glycidyl type methacrylate monomer and another nonepoxy containing copolymerizable monomer are also suitable (A) components. It is essential that the (A) component, copolymerized (i.e., cured) contain epoxy groups.

For higher strength it is preferred that an aliphatic or aromatic dimethacrylate, such as diethylene glycol dimethacrylate, 4,4'-diphenylene dimethacrylate, etc., be included in the composition to act as a cross-linking agent for at least some of the epoxy groups. Normally such crosslinking agent, when used, will be included in an amount of from about 10 to about 80 parts by weight per 100 parts by weight of (A) and (B) combined.

It should be noted that, according to the invention, the adhesive compositions do not necessarily include a curing (crosslinking) agent for the epoxy groups. Surprisingly, and contrary to our expectations, the adhesive compositions of the invention are highly resistant to water degradation even when uncured epoxy groups are present. We theorize, moreover, though we do not surely know, that pendent side-chain free epoxy groups have a plasticizing effect on the cured acrylate polymer chains which improves the overall toughness of the composition.

It is also noteworthy that the combination of (B) and (A) cures with markedly less shrinkage than normally observed with acrylate monomer-based adhesives, and that the resultant composition when cured exhibits a higher tensile strength than conventional acrylic-based adhesives. The improved tensile properties are particularly marked in adhesive compositions of the invention containing mineral fillers, since in conventional acrylic-based adhesives as mineral filler content is increased, tensile strength falls off rapidly whereas in the adhesives of the invention tensile strength is essentially maintained over a wide range of filler content. It has also been observed that the adhesives of the invention, within wide ranges of filler content, exhibit a toughness and mechanical stress/strain characteristic, as well as a tensile strength, that is similar to that of polycarbonate plastics and far better than those normally seen in thermoplastic or thermoacrylic adhesives.

DESCRIPTION OF THE PREFERRED EMBODIMENTS OF THE INVENTION

EXAMPLE 1

An adhesive particularly suitable for cementing orthodontic brackets to tooth enamel and for other dental uses, including seating of polycarbonate crown forms on tooth crown preparations, has the following basic formula:

|  | Parts by Wt. |
| --- | --- |
| Glycidyl methacrylate | 50 |
| Diethylene glycol dimethacrylate | 50 |
| Finely divided polymethylmethacrylate (filler) | 50 |
| Finely divided polyethylmethacrylate (filler) | 50 |
| Finely divided copolymer of methyl and ethyl methacrylate 50/50 (filler) | 100 |
| Benzoyl peroxide | 5 |
| N,N-bis(hydroxyethyl)-p-toluidine | 3 |
| Tertiary-butyl hydroxytoluene | 0.06 |

The properties of the cured material are:

| Hardness (Shore D) | 86 |
| --- | --- |
| Compressive Strength | 33,000 psi |
| Diametral Tensile Strength | 3,300 psi |

EXAMPLE 2

Another adhesive particularly suitable for cementing orthodontic brackets to tooth enamel and for other dental uses, including seating of polycarbonate crown forms on tooth crown preparations has the following basic formula:

|  | Parts by Wt. |
| --- | --- |
| 3,4-epoxybutylmethacrylate | 60 |
| Triethylene glycol dimethacrylate | 40 |
| Finely divided polymethylmethacrylate | 100 |
| Silica 10–20 $\mu$ | 100 |
| Benzoyl peroxide | 2.5 |
| N,N-bis (hydroxyethyl)-p-toluidine | 3.0 |
| Tertiary butylhydroxytoluene | 0.6 |
| The properties of the cured material are: |  |
| Hardness (Shore D) | 95 |
| Compressive Strength | 36,000 psi |
| Diametral Tensile Strength | 3,500 psi |

EXAMPLE 3

Another adhesive also suitable for cementing orthodontic brackets to tooth enamel, seating polycarbonate crown forms on tooth crown preparations and similar dental uses has the following basic formula:

|  | Parts by Wt. |
| --- | --- |
| Glycidyl methacrylate | 50 |
| Ethylene glycol dimethacrylate | 35 |
| Microcrystalline silica (10–20 μ) | 180 |
| Benzoyl peroxide | 4 |
| N,N-bis(hydroxyethyl)-p-toluidine | 3.0 |
| Tertiary butyl hydroxytoluene | 0.06 |

In lieu of 3 parts by weight N,N-bis(hydroxyethyl)-p-toluidine, 2 parts by weight N,N,3,5-tetramethyl aniline may be used in this formulation.

This adhesive has cured properties equivalent to those of the adhesives of Examples 1 and 2.

EXAMPLE 4

Still another adhesive within the scope of the invention has the formulation:

|  | Parts by Wt.: |
| --- | --- |
| Glycidyl methacrylate | 25 |
| Methyl methacrylate monomer | 25 |
| Dimethacrylic ester of 2,2-bis-(4-hydroxyphenyl)-propane | 50 |
| Finely divided polymethylmethacrylate (filler) | 200 |
| Benzoyl peroxide | 4 |
| Dimethyl aniline | 3 |
| Hydroquinone | 1 |

When cured the adhesive has properties equivalent to those of Examples 1 and 2.

It is to be recognized that the adhesive compositions of Examples 1–4 may be utilized in any of a variety of industrial uses and in cosmetic applications such as nail mending or artificial fingernail formulations in addition to suitability in dental compositions.

Obviously if it is desired to change set times, raise or lower uncured viscosity or alter mechanical properties of the cured composition, changes in formulation can be rapidly and easily made by those skilled in the art without departing from the ambit of this invention. Inclusion of conventional mineral fillers, if desired, in amounts up to about 65% by weight of the total composition is also within the ordinary skill of the art. Many other variations within the ambit of the invention will also be readily apparent to those of ordinary skill in the art.

EXAMPLE 5

The formulation of Example 1 (Composition D) was prepared and utilized to cement plastic orthodontic brackets of a type conventionally used in orthodontic work to four tooth samples under in vitro laboratory conditions. The samples were allowed to cure and were then immediately compared for adhesion to tooth enamel, to similar samples of cured commercial orthodontic adhesives A, B and C, defined below, which are in current use. The comparisons were all made on in vitro teeth under the same laboratory conditions, with all adhesives being in a state of optimum cure in accordance with the directions given by their manufacturers, at a time immediately after optimum cure was achieved, on the same Instron testing machine. The figures give tensile strength of the adhesive as measured at break of the bond between tooth enamel and adhesive bond unless otherwise indicated.

The results are as follows:

|  | Sample 1 | Sample 2 | Sample 3 | Sample 4 |
| --- | --- | --- | --- | --- |
| Composition A |  |  |  |  |
| Commercial adhesive comprised of 100 parts by wt. methyl methacrylate monomer and 100 parts by weight polymethylmetracrylate plus curing system sold for bonding metal orthodontic brackets to teeth [In this case conventional metal orthodontic brackets were used.] | 213 psi | 252 psi | 350 psi | 375 psi |
| Composition B |  |  |  |  |
| Commercial adhesive comprised of 100 pts by wt. methylmethacrylate monomer and 100 parts by weight polymethylmethacrylate plus curing system sold for bonding plastic orthodontic brackets to teeth [In this case as with C and D conventional plastic orthodontic brackets were used.] | 520 psi | 470 psi | 320 psi | 310 psi |
| Composition C |  |  |  |  |
| Commercial adhesive comprised of bis-GMA* plus methylmethacrylate monomer cured with ultraviolet light (from an ultraviolet gun) in the presence of a benzoin-methyl ether catalyst | 1000 psi | 420 psi | 1000 psi | 98 psi |
| Composition D |  |  |  |  |
| The formulation of Example 1 | 1690 psi* | 945 psi* | 1555 psi* | 1690 psi |

*In these three cases the tooth broke in the Instron testing machine at the figure given, but there was no indication of any failure of the plastic bracket-tooth enamel adhesive bond at that point.
i.e., diglycidyl ether of bisphenol A dimethacrylate

EXAMPLE 6

In a further comparison, each of three in vitro teeth were cemented to brackets with compositions A, B, C and D respectively under the conditions described in Example 5. The samples were then all placed in water at 37° C. and maintained there for one week, after which they were subjected to the same Instron test described in Example 5, with the following results:

|  | Sample 1 | Sample 2 | Sample 3 |
| --- | --- | --- | --- |
| Composition A [metal brackets] | 205 psi | 136 psi | 365 psi |
| Composition B [plastic brackets] | 275 psi | 350 psi | 205 psi |
| Composition C [plastic brackets] | 1184 psi | 710 psi | 415 psi |
| Composition D [plastic brackets] | 1025 psi | 1420 psi | 1190 psi |

As Examples 5 and 6 demonstrate, the orthodontic adhesive of Example 1 consistently demonstrates high bond strength to tooth enamel immediately after curing and consistently maintains that strength in the presence of water under the test conditions.

By contrast, compositions A and B exhibited a consistently markedly lower bond strength both immediately after curing and, under test conditions, after one week in water.

Composition C, while capable of achieving high initial bond strength (Example 5, Samples 1 and 3), and of maintaining it for one week under test conditions (Example 6, Sample 1) was not consistently reproducible and reliable in achieving such strength as was Composition D, prepared pursuant to Example 1. This lower reproducibility and reliability of Composition C could be expected to be even more striking under in vivo test conditions in the human mouth, inter alia, because of the cumbersome and inconvenient ultraviolet cure system employed and the practical difficulties attending the use of an ultraviolet gun in the mouth.

Clinical studies on Composition D in orthodontic and other dental uses are presently in progress. To date they demonstrate most satisfactory results, consistent with what might be predicted from the in vitro tests described in Examples 5 and 6.

Practical testing of adhesive compositions as herein described in industrial and cosmetic uses has also to date given satisfactory and highly promising results.

What is claimed is:

1. A rapid setting adhesive exhibiting high bond strength toward at least stainless steel, polycarbonate type plastics, and tooth enamel containing about 50 parts by weight glycidyl methacrylate, about 50 parts by weight of a finely divided cured polymethylmethacrylate, about 50 parts by weight of a finely divided polyethylmethacrylate, about 100 parts by weight of a finely divided copolymer of approximately equal amounts by weight of methylmethacrylate and ethylmethacrylate, about 50 parts by weight of diethylene glycol dimethacrylate crosslinking agent, less than about 5 percent of a conventional peroxide polymerization catalyst based on the combined weight of the glycidyl methacrylate and the finely divided fillers, and a minor amount of a conventional accelerator.

2. An adhesive composition as defined in claim 1 in the cured state.

3. A rapid setting adhesive exhibiting high bond strength toward at least stainless steel, polycarbonate type plastics, and tooth enamel containing about 60 parts by weight 3,4 epoxybutylmethacrylate, about 40 parts by weight triethylene glycol dimethacrylate, about 100 parts by weight of finely divided cured polymethylmethacrylate, about 100 parts by weight of silica having an average particle size about 10–20$\mu$, less than 5 percent of a conventional peroxide polymerization catalyst based on the combined weight of the 3,4-epoxybutylmethacrylate and the finely divided filters, and a minor amount of a conventional accelerator.

4. An adhesive composition as defined in claim 3 in the cured state.

5. A rapid setting adhesive exhibiting high bond strength toward at least stainless steel, polycarbonate type plastics, and tooth enamel containing about 50 parts by weight glycidyl methacrylate, about 35 parts by weight ethylene glycol dimethacrylate, about 180 parts by weight microcrystalline silica having an average particle size about 10–20$\mu$, less than about 5 percent of a conventional peroxide polymerization catalyst based on the combined weight of the glycidyl methacrylate and the finely divided silica, and a minor amount of a conventional accelerator.

6. An adhesive composition as defined in claim 5 in the cured state.

7. A rapid setting adhesive exhibiting high bond strength toward at least stainless steel, polycarbonate type plastics, and tooth enamel containing about 25 parts by weight of glycidyl methacrylate, about 25 parts by weight methyl methacrylate monomer, about 50 parts by weight of the dimethacrylate ester of 2,2-bis-(4-hydroxyphenyl)-propane, and about 200 parts by weight finely divided cured polymethylmethacrylate filler, less than about 5 percent of a conventional peroxide polymerization catalyst based on the combined weight of the glycidyl methacrylate, methyl methacrylate and finely divided filler, and a minor amount of a conventional accelerator.

8. An adhesive composition as defined in claim 7 in the cured state.

* * * * *